United States Patent [19]

Chang

[11] Patent Number: 4,816,532

[45] Date of Patent: Mar. 28, 1989

[54] ACRYLATE CURED POLYPHOSPHAZENES

[75] Inventor: Suae-Chen Chang, Baton Rouge, La.

[73] Assignee: Ethyl Corporation, Richmond, Va.

[21] Appl. No.: 171,129

[22] Filed: Mar. 21, 1988

[51] Int. Cl.$^4$ .............................................. C08G 18/04
[52] U.S. Cl. ..................................... 525/538; 528/69;
528/168; 528/399
[58] Field of Search .................. 525/538; 528/69, 168,
528/399

[56] References Cited

U.S. PATENT DOCUMENTS 4,006,125  2/1977  Reynard et al. ................... 260/77.5
4,221,904  9/1980  Hergenrother et al. ............ 528/399
4,242,491  12/1980  Hergenrother et al. ............ 528/168

Primary Examiner—Maurice J. Welsh
Attorney, Agent, or Firm—W. G. Montgomery

[57] ABSTRACT

Polyorganophosphazenes having at least some N-(acryloxyhydrocarbyl)carbamyloxyhydrocarbyloxy groups:

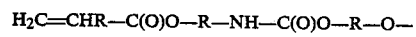

bonded to phosphorus can be cross-linked by exposure to ultraviolet radiation.

28 Claims, No Drawings

ACRYLATE CURED POLYPHOSPHAZENES

BACKGROUND

Polyorganophosphazenes are polymers having a backbone of alternating phosphorus and nitrogen atoms and for this reason have been referred to as "inorganic polymers." Each phosphorus, however, carries two substituent groups which can be inorganic, e.g. chlorine, or organic, e.g. phenoxy. The polymers may be low molecular weight such as cyclic trimers, tetramers and the like or oligomers containing about 3–20 repeating —P=N— units. The more useful polymers are the high molecular weight open-chain polymers such as those described in U.S. Pat. Nos. 3,515,688; 3,702,833; 3,856,712 and 3,856,713. These polymers are soluble in solvents such as tetrahydrofuran (THF), cyclohexane toluene, etc. but can be cured (i.e., cross-linked) to insoluble polymers by means such as sulfur vulcanization or free-radical (e.g., peroxide) catalysts. Curing is more readily accomplished if the soluble polymer contains some olefinically unsaturated groups such as ortho-allylphenoxy (e.g., U.S. Pat. Nos. 3,970,533; 3,972,841 and 4,116,785).

Reynard et al. U.S. Pat. No. 3,948,820 describe open-chain polyorganophosphazenes having hydroxy substituents which can be crosslinked, by reaction with organic diisocyanates, e.g., toluene diisocyanate, to form a urethane-type cross-link. Reynard et al. U.S. Pat. No. 4,006,125 describes similar polymers wherein the hydroxy-substituted polyorganophosphazene is reacted with an excess of organic polyisocyanate such that the polymer is not cross-linked but is substituted through a urethane-type bond with an isocyanate terminated side chain. Such polymers can be cured by a small amount of water such as is present in moist air.

SUMMARY OF THE INVENTION

It has now been discovered that polyorganophosphazenes which have a small amount of N-(acryloxyhydrocarbyl)carbamyloxyhydrocarbyloxy substituents can be readily cured by exposure to ultraviolet radiation.

DESCRIPTION OF THE PREFERRED EMBODIMENTS

A preferred embodiment of the invention is a curable cyclic or open-chain polyorganophosphazene which comprises 3–50,000 units having the structures:

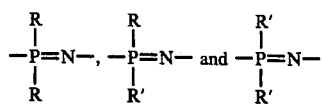

wherein R is a substituted or unsubstituted alkyl, cycloalkyl, aryl, alkoxy, cycloalkoxy, or aryloxy or mixtures thereof and $R^1$ is a substituent having the formula:

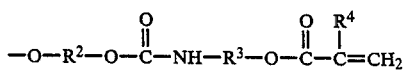

wherein $R^2$ and $R^3$ are divalent hydrocarbon groups containing 2–12 carbon atoms and $R^4$ is hydrogen or methyl and at least some of said units have an R' substituent.

The uncured polyorganophosphazene may be cyclic or open-chain. Cyclic polyorganophosphazenes contain from 3 up to 20 repeating

units. The most common cyclics are trimers and tetramers, especially trimers.

Open-chain polyorganophosphazene can contain from about 3 up to 50,000 or more

units. The lower molecular weight polymers contain about 3–20

units are referred to as oligomers. These open-chain polymers are mainly linear although some branching may occur. The polymers are not cross-linked and are soluble in solvents such as tetrahydrofuran, benzene, toluene, cyclohexane, dioxane, dimethoxyethane and the like.

Substituent groups represented by R can be substituted or unsubstituted alkyl (e.g., methyl, ethyl, n-propyl, isopropyl, n-hexyl, 2-ethyl hexyl-n-dodecyl, 2-chloroethyl, 2-fluoroethyl, phenethyl, benzyl, 2,2,2-trifluoroethyl, perfluoroethyl, 4,4,3,3,2,2,-hexafluorobutyl, 2-nitroethyl, 2-ethoxyethyl and the like).

Likewise substituted or unsubstituted cycloalkyl substituents may be bonded to phosphorus. Examples of these are cyclohexyl, cycloheptyl, cyclooctyl, cyclododecyl, 4-chlorocyclohexyl, 4-bromocyclohexyl, 4-fluorocyclohexyl 4-nitrocyclooctyl, 2-acetocyclohexyl, 4-acetoxycyclohexyl and the like.

Useful aryl substituents are phenyl, tolyl, naphthyl, 4-ethylphenyl, 2-allylphenyl, 4-chlorophenyl, 4-trifluoromethylphenyl, 2-nitrophenyl, 4-acetoxyphenyl, 4-methoxyphenyl and the like.

The alkoxy, cycloalkoxy and aryloxy substituents are similar to the above except are bonded through oxygen to phosphorus. Some examples are methoxy, ethoxy, 2-methoxyethoxy, polyethoxyethoxycyclohexoxy, cyclooctyloxy, benzyloxy, 2,2,2-trifluoroethoxy, 4,4,3,3,2,2-hexafluorobutoxy, 4-ethylphenoxy, 2-allylphenoxy, 4-methoxyphenoxy and the like.

An especially useful class of polyorganophosphazenes are the polyaryloxyphosphazenes. Such polymers have phenoxy and/or substituted phenoxy substituted on phosphorus. An especially useful polyaryloxyphosphazene has a mixture of both phenoxy and alkylphenoxy substituents such as 30–70 mole percent phenoxy and 30–70 mole percent 4-ethyl phenoxy.

Another especially useful class of polyorganophosphazene has fluoroalkoxy substituents wherein the fluoroalkoxy groups are represented by the formula:

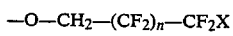

wherein n is zero or an integer from 1 to 15 and x is H or F. These are referred to as polyfluoroalkoxyphosphazene.

It really is not critical what the 2 organo substituents on phosphorus are as long as there are at least some, sufficient to impart cure, of the N-(acryloxyhydrocarbyl)carbamyloxyhydrocarbyloxy substituent. These have the formula:

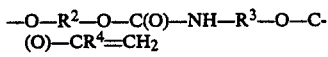

wherein $R^2$ and $R^3$ are divalent hydrocarbyl groups containing 2–12 carbon atoms and $R^4$ is hydrogen or $CH_3$. From this it is apparent that the term "acryl" is used in a generic sense to mean both the acryl group, $—C(O)—CH=CH_2$, as well as the methacryl group, $—C(O)—C(CH_3)=CH_2$. The divalent hydrocarbon group can be aliphatic, cycloaliphatic or aromatic. Some examples are: $—CH_2—CH_2—$, $—CH_2—CH(CH_3)—$, $—(CH_2)_{12}—$, 1,4-cyclohexylene, 1,4-phenylene and the like. The number of such groups is not critical as long as there are a sufficient number to impart the desired degree of cure when exposed to ultraviolet radiation. A useful range is about 0.1–50 mole percent of the total phosphorus substituent. The low molecular weight polymers, e.g. where n is about 3–10, preferably have about 33–50 mole percent of the phosphorus substituents as acrylate terminated groups whereas the high molecular weight polymers, e.g. where n is about 15,000 or higher require only about 0.1–1.0 mole percent acrylate terminated groups.

The acrylate or methacrylate terminated groups may be introduced by first reacting polyphosphonitrilic chloride having the desired chain structure (i.e., cyclic or open-chain) and number of

units (i.e., 3–50,000 or more) with reagents to introduce the desired phosphorus substituents (e.g., sodium ethoxide, butyl magnesium bromide, phenyl magnesium bromide, sodium 2,2,2-trifluoroethoxide, sodium phenoxide, sodium p-ethylphenoxide and the like) in an amount which is not sufficient to react with all of the chlorine bound to phosphorus. Then the remaining chlorine can be reacted with a sodium hydroxyhydrocarbyloxide such as sodium 3-hydroxybutoxide to introduce an hydroxyalkoxy group. Alternatively the hydroxyl terminated groups may be inserted first by reaction of the polyphosphonitrilic chloride with a sodium (or potassium) hydroxyhydrocarbyloxide followed by reaction of the remaining chlorine atoms with a different nucleophile. The methods described in Reynard et al. U.S. Pat. Nos. 3,948,820 and 4,006,125, incorporated herein by reference, can be used to introduce the hydroxyalkyloxy or hydroxyaryloxy groups. The hydroxy functional group can also be attached by a substituent exchange process involving a fluoroalkoxyphosphazene and the mono sodium salt of a diol. For example:

$(PN(ORf)_2)_n + x\ NaOR^2OH \rightarrow$
$[PN(ORf)_{2-x}(OR^2OH)_x]_n + x\ NaORf$ wherein (ORf) is a fluoroalkoxy group.

The acrylate or methacrylate function can be obtained by reacting the hydroxyhydrocarbyloxy substituent polyorganophosphazene with an acrylate or methacrylate ester of a hydroxyhydrocarbyl isocyanate such as methacryloxyethylisocyanate. These have the structure:

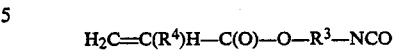

wherein $R^3$ and $R^4$ are as previously defined.

The reaction of the above isocyanate with the hydroxy-functional polyorganophosphazene is promoted by the inclusion of a conventional polyurethane catalyst such as an organotin compound, e.g., dibutyltin dilaurate.

The resultant polyorganophosphazene having N-(acryloxy or methacryloxy hydrocarbyl)carbamyloxyhydrocarbyloxy substituents can be readily crosslinked or cured through its acrylate or methacrylate function by exposure to ultraviolet radiation. The degree of cure depends on the thickness of the material, the intensity of the ultraviolet radiation and the time of exposure. When using a conventional 500 watt mercury vapor lamp, thin films are cured in 0.5–10 minutes. Ultraviolet cure is promoted by including a small amount of benzophenone as a sensitizer. Tack of the cured product is reduced by including a small amount of an alkanol amine such as triethanol amine. The use of benzophenone and triethanol amine in acrylate crosslinking is conventional.

The preparation and curing of the N-(acryloxy or methacryloxy hydrocarbyloxy)carbamyloxy hydrocarbyloxy-substituted polyorganophosphazenes is shown in the following example.

EXAMPLE 1

A 138.4 g portion of open-chain polyphosphonitrilic chloride (approximately mole weight 6,000) was dissolved in 310.9 g of toluene. This solution was poured into 785.2 g n-heptane to precipitate the open chain polyphosphonitrilic chloride (120.3 g) as a brown oil leaving the cyclic oligomers in solution.

In another flask was placed 57.6 g (2.5 moles) freshly cut sodium and 1644 g dry THF. A mixture of 142.3 g (1.422 moles) of 2,2,2-trifluoroethanol and 166.86 g (0.76 moles) of a mixture $H—(CF_2—CF_2)_x—CH_2OH$ wherein x represents an integer from 1 to about 7 and 48.18 g (0.53 mole) of 1,3-butanediol was then added to the sodium over a 1-hour period at 25°–45° C. Stirring was continued 2 hours at 40°–45° C. and the mixture allowed to stand overnight at ambient temperature. The following day the mixture was heated to reflux to complete the reaction of the sodium.

Another reaction flask was charged with 2017.7 g (2.2195 equivalent) of the above alkoxide solution. Then 119.4 g of the above polyphosphonitrilic chloride brown oil dissolved in 310 g of dry toluene was added to the alkoxide solution over 70 minutes at 25°–64° C. The mixture was then refluxed (71° C.) for 6 hours.

The reaction mixture was then neutralized to pH 6.5–7 with 7.33 g (0.075 mole) concentrated $H_2SO_4$. Then 1229 ml deionized $H_2O$ was added and the mixture transferred to a separatory funnel. The lower water layer was removed and the organic layer added to 4 l n-heptane. The yellow heptane phase was removed and the polymer washed with 300 ml heptane. The polymer was then dissolved in 287.9 g acetone and the solution pressure filtered through a Teflon ® (PTFE) 0.2 micron filter. The filtrate was added to 2.5 l deionized water along with 181.5 g acetone. The aqueous phase was then decanted and the remaining polymer was washed with water.

The polymer was treated with 1303 g diethyl ether and 225.6 g acetone. The solution was then evaporated in a rotary evaporator to remove water and the residue dissolved in acetone. The acetone solution was again evaporated leaving the polymer which was again dissolved in acetone. The solvent was again evaporated in a rotary dryer (70° C./1 torr) leaving 217.65 g of a polyfluoroalkoxyphosphazene having 3-hydroxybutoxy substituents.

In another reaction flask was placed 10.52 g of the hydroxyl-functional polyphosphazene and 63.8 g THF. An 8 microliter portion of dibutyltin dilaurate (catalyst) and 0.5 g (3.22 millimole) of isocyanatoethyl methacrylate (aka methacryloxyethylisocyanate) was added and the solution was stirred overnight under nitrogen. An additional 16 microliters of tin catalyst was added and the mixture stirred for 2 more hours. The THF solvent was then removed in a rotary evaporator (45° C./1 torr) leaving 11.16 g of yellow taffy-like polymer.

A 1.61 g portion of the polymer was dissolved in 3.93 ml THF. Then 0.15 g of benzophenone and 0.08 g triethanolamine were added. Part of the solution was filtered through a 0.45 PTFE filter and the clear solution applied to a clear glass microscope slide. The solvent was evaporated giving a white sticky coating. The coating was irradiated with 550 watt medium pressure mercury lamp for 2 minutes at a distance of 7.6 cm. The coating cured to an opaque, THF insoluble film. The film was still slightly tacky so was exposed to the ultraviolet lamp for an additional 7 minutes which reduced the tacky feel.

As shown above, another embodiment of the invention is a cured or cross-linked cyclic or open-chain polyorganophosphazene which, prior to cross-linking, contained 3-50,000 or more units having the structure:

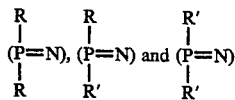

wherein R is a substituted or unsubstituted alkyl, cycloalkyl, aryl, alkoxy, cycloalkoxy or aryloxy or mixtures thereof and R' is a substituent having the formula:

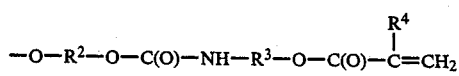

wherein $R^2$ and $R^3$ are divalent hydrocarbon groups containing 2–12 carbon atoms and $R^4$ is hydrogen or methyl and at least some, preferably 0.1–50 mole percent, of the substituents bonded to phosphorus are R' groups.

Another way of describing this same embodiment is as a cross-linked polyorganophosphazene wherein the cross-link has the structure:

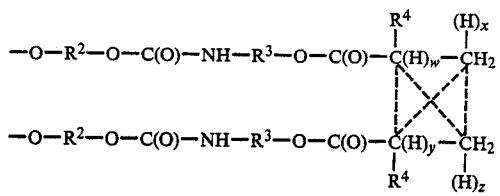

where $R^2$, $R^3$ and $R^4$ are as in claim 1 and w, x, y and z are 0 or 1 and w+x=1 and y+z=1 and the dashed lines represent possible direct bonds between carbon atoms and only one such direct bond is present in each of the cross-linking structures and is between the 2 carbon atoms which have a zero value for w, x, y or z indicating the absence of the (H) on such carbon atoms. The cross-linking structures need not all be the same.

The cured polyorganophosphazenes can be used as potting compounds for electrical devices. They are especially useful as coating compositions for a wide range of substrates.

I claim:

1. A curable cyclic or open chain polyorganophosphazene which comprises 3–50,000 units having the structures:

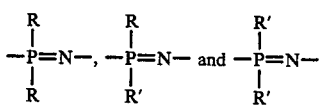

wherein R is a substituted or unsubstituted alkyl, cycloalkyl, aryl, alkoxy, cycloalkoxy, or aryloxy or mixtures thereof and R' is a substituent having the formula:

wherein $R^2$ and $R^3$ are divalent hydrocarbon groups containing 2–12 carbon atoms and $R^4$ is hydrogen or methyl and at least some of said units have an R' substituent.

2. A polyorganophosphazene of claim 1 wherein $R^2$ is a divalent aliphatic hydrocarbon group containing 2–12 carbon atoms.

3. A polyorganophosphazene of claim 2 wherein $R^3$ is a divalent aliphatic hydrocarbon group containing 2–12 carbon atoms.

4. A polyorganophosphazene of claim 3 wherein $R^4$ is methyl.

5. A polyorganophosphazene of claim 4 wherein R is a substituted or unsubstituted alkoxy or aryloxy or mixture thereof.

6. A polyorganophosphazene of claim 5 wherein R is mainly fluoroalkoxy groups or mixture of said groups having the formula:

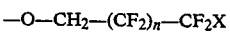

wherein n is zero or an integer from 1–15 and X is hydrogen or fluorine.

7. A polyorganophosphazene of claim 5 wherein R is mainly substituted or unsubstituted phenoxy or mixtures thereof.

8. A polyorganophosphazene of claim 4 wherein $R^2$ is a group having the structure:

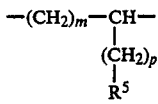

wherein m is an integer from 1 to 4, p is zero or an integer from 1–4 and $R^5$ is hydrogen or methyl.

9. A polyorganophosphazene of claim 8 wherein $R^3$ is $-CH_2-CH_2-$.

10. A polyorganophosphazene of claim 8 wherein m is 2, p is zero and $R^5$ is methyl.

11. A polyorganophosphazene of claim 10 wherein $R^3$ is $-CH_2-CH_2-$.

12. A polyorganophosphazene of claim 8 wherein R is a substituted or unsubstituted alkoxy or aryloxy or mixture thereof.

13. A polyorganophosphazene of claim 11 wherein R is mainly substituted or unsubstituted phenoxy or mixtures thereof.

14. A polyorganophosphazene of claim 11 wherein R is mainly fluoroalkoxy groups or mixtures of said groups having the formula:

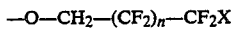
$$-O-CH_2-(CF_2)_n-CF_2X$$

wherein n is zero or an integer from 1–15 and X is hydrogen or fluorine.

15. A cross-linked polyorganophosphazene of claim 1.

16. A cross-linked polyorganophosphazene of claim 15 wherein said cross-link has the structure:

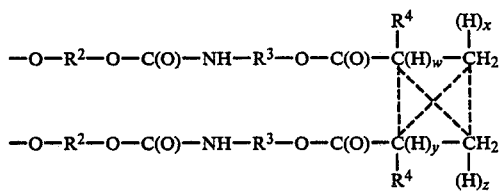

where $R^2$, $R^3$ and $R^4$ are as in claim 1 and w, x, y and z are 0 or 1 and w+x=1 and y+z=1 and the dashed lines represent possible direct bonds between carbon atoms and only one such direct bond is present in each of said cross-link structures in said polyorganophosphazene and is between the 2 carbon atoms which have a zero value for w, x, y or z indicating the absence of the (H) on such carbon atoms.

17. A cross-linked polyorganophosphazene of claim 16 wherein $R^2$ is a divalent aliphatic hydrocarbon group containing 2–12 carbon atoms.

18. A cross-linked polyorganophosphazene of claim 17 wherein $R^3$ is a divalent aliphatic hydrocarbon group containing 2–12 carbon atoms.

19. A cross-linked polyorganophosphazene of claim 18 wherein $R^4$ is methyl.

20. A cross-linked polyorganophosphazene of claim 19 wherein R is a substituted or unsubstituted alkoxy or aryloxy or mixture thereof.

21. A cross-linked polyorganophosphazene of claim 20 wherein R is mainly fluoroalkoxy groups or mixture of said groups having the formula:

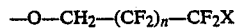
$$-O-CH_2-(CF_2)_n-CF_2X$$

wherein n is zero or an integer from 1–15 and X is hydrogen or fluorine.

22. A cross-linked polyorganophosphazene of claim 20 wherein R is mainly substituted or unsubstituted phenoxy or mixtures thereof.

23. A cross-linked polyorganophosphazene of claim 19 wherein $R^2$ is a group having the structure:

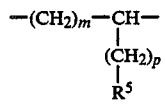

wherein m is an integer from 1 to 4 and p is zero or an integer from 1–4 and $R^5$ is hydrogen or methyl.

24. A cross-linked polyorganophosphazene of claim 23 wherein $R^3$ is $-CH_2-CH_2-$.

25. A cross-linked polyorganophosphazene of claim 23 wherein m is 2, p is zero and $R^5$ is methyl.

26. A cross-linked polyorganophosphazene of claim 25 wherein $R^3$ is $-CH_2-CH_2-$.

27. A cross-linked polyorganophosphazene of claim 23 wherein R is a substituted or unsubstituted alkoxy or aryloxy or mixture thereof.

28. A cross-linked polyorganophosphazene of claim 26 wherein R is mainly fluoroalkoxy groups or mixtures of said groups having the formula:

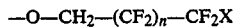
$$-O-CH_2-(CF_2)_n-CF_2X$$

wherein n is zero or an integer from 1–15 and X is hydrogen or fluorine.

* * * * *